United States Patent Office 3,392,123
Patented July 9, 1968

---

3,392,123
CHEMILUMINESCENT FORMULATIONS
Hilmer E. Winberg, Wilmington, Del., assignor to E. I. du Pont de Nemours and Company, Wilmington, Del., a corporation of Delaware
No Drawing. Filed Oct. 17, 1962, Ser. No. 232,336
14 Claims. (Cl. 252—188.3)

This invention relates to novel chemiluminescent marking materials and more particularly to waxy chemiluminescent formulations which are especially suited for nocturnal marking agents.

It has now been discovered that by incorporating certain chemiluminescent peraminoethylenes in one or more selected aliphatic or alicyclic hydrocarbon waxes or blends thereof with certain oils and polymers, there are produced nocturnal marking materials which are unique in their ability to self-seal and to retain their excellent crayonability event at elevated temperatures. Moreover, the brightness and durability of chemiluminescence exhibited by these materials when a surface thereof is wiped free from the self-formed overcoat are highly satisfactory.

By the term "self-seal" is meant the ability of chemiluminescent materials in bulk to produce, of their own accord, upon standing exposed to air, a protective or chemiluminescent-quenching overcoat of film thickness. When the material is rubbed or crushed against a substrate, the coherency of the oxidized protective overcoat is readily destroyed and the material thus exposed to air can be used immediately as a marker. The newly coined term "crayonability" refers to the ability of a material to function as a crayon, i.e., writing or marking instrument. In other words, a marking material of good crayonability is one which deposits a heavy uniform and smooth layer free lumps upon substrate without mushrooming, flaking, or crumbling.

In its briefest aspect, the invention is directed to an article of manufacture such as a marking stick or crayon comprising a bodying material and a substance which chemiluminesces in air, said article being further characterized by its capacity to self-seal.

The active chemiluminescent ingredient of the compositions of this invention is a peraminoethylene of the formula

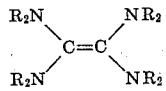

in which the R's which can be alike or different, are straight or branched chain alkyl or cycloalkyl hydrocarbon radicals of from 1-10 carbons each, preferably no more than five carbons each, which can be joined pairwise on one nitrogen to form 3-5 membered monoazaheterocycles and on two nitrogens to form 3-7 membered diazaheterocycles. These tetrakis(disubstituted-amino) ethylenes and their preparation are more fully disclosed and claimed in the coassigned, copending application of Hilmer E. Winberg, Ser. No. 174,404, filed on Feb. 20, 1962, which in turn is a continuation-in-part of U.S. Ser. No. 836,062, filed Aug. 26, 1959.

The first member of this series of peraminoethylenes, namely, tetrakis(dimethylamino)ethylene, can be prepared by the reaction of dimethylamine and chlorotrifluoroethylene, as reported by Pruett et al., J. Am. Chem. Soc., 72, 3646 (1950). However, this Pruett et al. method of preparation does not proceed for the other members of the series. In contrast, they are prepared by the ready reaction between the requisite basic secondary amine and any amide acetal, i.e., any disubstituted-aminodihydrocarbyloxymethane in accord with the following stoichiometry:

(1) 

(2) 

(3) 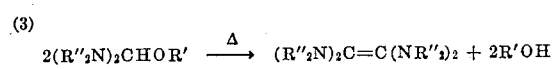

wherein the R's, which can be alike or different, are monovalent alkyl or cycloalkyl radicals, generally of no more than eight carbons each, which can be together joined (in a divalent radical) to form with the intervening nitrogen a heterocycle of from three to seven ring members; the R's which can also be alike or different, or together joined, are monovalent (or divalent) alkyl, aryl, aralkyl, alkaryl, or cycloalkyl radicals, generally of no more than eight carbons each, and when together joined, form with the two oxygens and intervening carbon a 1,3-dioxaheterocycle of from five to seven ring members; and the R'''s which can also be alike or different or together joined, are monovalent (or divalent) alkyl or cycloalkyl hydrocarbon radicals of no more than eight carbons each, and, in the case of the divalent radicals, no more than two to six carbons per divalent radical. In any event, when two R'''s are together joined on the same nitrogen, they form with the indicated amine nitrogen a monoazaheterocycle of three to five members, or when they are on different nitrogens on the same carbon, they form with the indicated two amine nitrogens a diazahetrocycle of from three to seven ring members.

The so-called bodying material of the chemiluminescent formulations comprises at least one non-aromatic hydrocarbon wax. The aliphatic and alicyclic hydrocarbon waxes which can be used in the formulations of this invention include paraffin, microcrystalline waxes such as Aristowax, amorphous hydrocarbon waxes such as ozokerite and petrolatum. Blends of these waxes may be used to special advantage. Inclusion of Aristowax is found to impart improved crayonability to the wax blend while the presence of petrolatum appears to decrease hardness and graininess of the blends. The ozokerite is believed to contribute to a high melting point. However, the effect each of the above-named waxes, taken singly or in combination, will have on the melting point of the resulting waxy compositions containing the chemiluminescent ingredient, defies prediction.

In addition to hydrocarbon waxes, either alone or in blends, the bodying material may contain certain polymeric substances especially polyolefins or copolymers containing polyolefins such as, for example, polyisobutylene (Vistanex) and ethylene/vinyl acetate ("Elvax" vinyl resin). Such polymeric materials have been found to have a highly beneficial effect on the overall crayonability of the formulation. Not only does the polyolefin serve as a binder and decreases graininess and hardness of the waxy blends, but it also increases the tack and tends to enhance the light output.

Still other supplemental agents can be utilized in the marking materials of this invention. They include pigments such as titanium dioxide and the like, colloidal silica and dyes. The latter ingredient is essential if a luminescent deposit o fa specific color is sought. Such supplemental agents when present are used in relatively minor proportions in the compositions.

In the production of the chemiluminescent formulations in accordance with this invention, a non-aromatic hydrocarbon wax is admixed with the chemiluminescent peraminoethylene in the absence of oxygen, the wax being in a molten form. The relatively clear free-flowing liquid which is obtained is then poured into molds and allowed to cool in such molds in order to convert the mixture into the desired form. If a polymer or supplemental agent is to be added, then all of the ingredients are added in dry form as, for example, in the form of flakes, chips, beads or the like at the beginning of the preparation. The resulting mixture is heated and agitated or stirred until the polymer dissolves in the molten wax and any pigment present is uniformly suspended. In the final step of the process, the molten mixture is cast into appropriate forms and cooled until solid. If desired, the final chemiluminescent composition can be formed by extrusion into rods, beads and the like, or injection molded into its final shape.

The proportions of the ingredients comprising the chemiluminescent marking compositions of the present invention are somewhat variable. In all cases, the hydrocarbon wax ingredient or ingredients will constitute the major or one of the major constituents and the chemiluminescent peraminoethylene will, in general, constitute less than 50% of the total weight of the composition. In most cases the chemiluminescent ingredient comprises from about 10% to about 50% of the color marking material and will usually fall within the range of about 15% to about 33%. The hydrocarbon waxes will, in the usual case, comprise from about 50% to 75% by weight of the total composition, while the polymeric ingredients, e.g., Vistanex, ordinarily falls within the range of proportions of about 25% to about 2% or less. A particularly preferred composition comprises 3 parts of ozokerite
5 parts of Aristowax
3 parts of petrolatum
1 part of Vistanex and from 3 to 3.5 parts of tetrakis(dimethylamino)ethylene.

It should be understood that the marking compositions of the instant invention can be made in the configuration of not only sticks, rods, pencils and the like, but in such forms as beads, blocks or films which can be crushed or brushed to expose fresh chemiluminescent surfaces. When the term "crayon" is used herein, it encompasses a solid body of elongated character of the general configuration of a rod, stick, pencil, or similar body.

The following examples are illustrative of the chemiluminescent marking materials made in accordance with the present invention. It will be understood that other compositions can readily be evolved in the light of the teaching and guiding principles disclosed herein and therefore the examples are to be understood as illustrative and by no means limitative of the full scope of the invention. Unless otherwise indicated, all parts in examples are by weight.

EXAMPLE I

In a vessel blanketed with nitrogen, 0.86 part of tetrakis(dimethylamino)ethylene was mixed with 5 parts melted paraffin. The composition was cooled, and the wax which resulted was found to luminesce on exposure to air. Twice the composition was remelted under nitrogen, and 0.86 part tetrakis(dimethylamino)ethylene was added. Small aliquots of the composition resulting from the first addition were spread on glass and paper. They luminesced for at least one hour. The final composition after cooling was a soft wax which luminesced in air for a long time.

A similar composition was prepared from 75 parts Esso Household Paraffin Wax and 21.5 parts tetrakis(dimethylamino)ethylene. It had a melting point (ASTM Test D127–60) of 46.8° C. The paraffin wax alone had a melting point of 54.4° C. The wax/tetrakis(dimethylamino)ethylene composition had a hardness (ASTM D 1321–61T) of 59 and 102 decimillimeters at 0° C. and 25° C. under loads of 150 g. and 100 g., respectively, expressed as penetrations of a standard needle in 5 seconds.

EXAMPLE II

In a vessel blanketed with nitrogen, 25 parts paraffin wax, 5 parts polyisobutylene (Vistanex LM–MS, Enjay Chemical Co.) and 10 parts $TiO_2$ were stirred together at 100° C. until the Vistanex was dissolved in the molten wax and the $TiO_2$ was uniformly suspended. There was then added 20 parts tetrakis(dimethylamino)ethylene. The molten mixture was cast into lead tubes and cooled until solid. The product so prepared could be used as a crayon by peeling off the top part of the lead and rubbing the waxy composition on paper or other appropriate surface. The layer deposited on the paper was quite smooth and evolved light for some time in contact with air.

EXAMPLE III

The following composition was prepared and cast into a crayon as described in Example II: ethylene/vinyl acetate copolymer ("Elvax" vinyl resin 250) 2 parts, microcrystalline wax (Aristowax 143–150, Petroleum Specialties Co.) 8 parts, tetrakis(dimethylamino)ethylene 3.4 parts. The crayon thus prepared was considerably harder than that described in Example II and therefore deposited a thinner layer, but little or no flaking occurred. Light output on exposure to air was moderate.

EXAMPLE IV

Compositions containing 3.4 and 8.6 parts tetrakis(dimethylamino)ethylene per 5 parts household paraffin wax, respectively, were prepared as described in Example II. That containing the most tetrakis(dimethylamino)ethylene was softer than the other but was still waxy and not sticky. The mixtures were homogeneous and all luminesced with a bluish color when exposed to air. Luminescence continued for at least 5 hours after the initial exposure to air.

EXAMPLE V

A wax composition containing 0.75 parts colloidal silica (Cab-O-Sil), 5 parts paraffin wax, and 4.3 parts tetrakis(dimethylamino)ethylene was prepared as described in Example I. The silica enhanced the luminescence observed when the composition was exposed to air as compared with similar compositions containing only wax and tetrakis(dimethylamino)ethylene.

EXAMPLE VI

A crayon was prepared as described in Example II using 4.5 parts Three Star Snow White Ozokerite (International Wax & Refining Co.), 4.5 parts Perfecta U.S.P. Petrolatum (Sonneborn Chemical & Refining Division, Witco Chemical Co.), 2 parts polyisobutylene (Vistanex LM–MS), and 2.6 parts tetrakis(dimethylamino)ethylene. This composition was moderately soft and deposited a very uniform thick layer when rubbed on paper or other substrate. A layer deposited by rubbing the crayon on filter paper and exposing to air displayed a high light evolution.

In quantitative tests the paper and waxy composition thereon were placed in close proximity to a selenium photo-voltaic cell in a lightproof box. The electrical output of the cell illuminated with said wax composition was determined by means of a microvolt indicating amplifier (Leeds & Northrup Co.), a recorder, and an integrator (Research Appliance Co. Model 458–P). The maximum light output was of the order of 2.5 footlamberts, and the integrated light output during the first 5 minutes was 4–5 lumen-seconds. Similar compositions containing 3.1 parts tetrakis(dimethylamino)ethylene instead of 2.6 had a melting point of 83.8° C. as determined by ASTM Test D127–60. Hardness was determined by ASTM Test D1321–61T (a special cone having a 7-mil flat tip and a double taper of 29° 14' for 0.11″ and 89° 57′ for the next .068″ was used for the 50° test) at 0, 25, and 50° C. Under loads of 150, 100, and 100 g., respectively, penetrations were 107, 170, and 57 decimillimeters, respectively, in 5 seconds.

EXAMPLE VII

Luminescent crayons were prepared as described in Example II from 15 parts Three Star Snow White Ozokerite, 25 parts microcrystalline wax (Aristowax 143–150), 15 parts Perfecta U.S.P. Petrolatum, 5 parts polyisobutylene (Vistanex LM–MS), and 17.2 parts tetrakis(dimethylamino)ethylene. The crayons deposited very uniform coats when rubbed on paper or a hard surface such as Alberene stone without mushrooming unduly or without flaking or depositing lumps.

The light evolution as determined by the procedure described in Example VI was a 2.44 foot-lamberts soon after application to the filter paper. The integrated output for the first 10 minutes was 4.6 lumen-seconds. The melting point of the crayons varied from 75.4 to 78.9° C. The hardness at 0°, 25° and 50° C. under loads of 150, 100, and 100 g., respectively, was 71, 108, and 53 decimillimeters, respectively.

In nocturnal tests, the crayon was applied to a 4 in. x 6 in. piece of cardboard. The thus illuminated cardboard was easily visible at a distance of 1000 ft. and visually the light intensity did not diminish appreciably during 30 minutes. After 5 hours, the board was still visible at 50 feet.

EXAMPLE VIII

A composition was prepared as described in previous examples using 3 parts Three Star Snow White Ozokerite, 5 parts Aristowax 143–150, 3 parts Perfecta U.S.P. Petrolatum, 1 part Vistanex LM–MS, and 2.6 parts 1,1′,3,3′-tetraethyl-$\Delta^{2,2'}$-bi(imidazolidine). When rubbed on paper in air, the composition emitted an orange colored light.

Similar compositions were prepared using mixtures of tetrakis(dimethylamino)ethylene and 1,1′,3,3′-tetraethyl-$\Delta^{2,2'}$-bi(imidazolidine). They exhibited especially strong chemiluminescence of relatively short duration.

EXAMPLE IX

As described in previous examples, a composition was prepared containing 6 parts Three Star Snow White Ozokerite, 10 parts Aristowax 143–150, 6 parts Perfecta U.S.P. Petrolatum, 2 parts Vistanex LM–MS, 0.66 part dye (Colour Index Solvent Blue 36), and 6.9 parts tetrakis(dimethylamino)ethylene. When rubbed on paper in air in the dark, this composition gave a very blue luminescent deposit as distinct from the much greener deposits from the composition of Example VII.

In the use of the marking compositions of the present invention, the end of the article, for example, the crayon which is exposed to air, the remainder of the article being preferably enveloped in a metal or plastic sheath, is rubbed on a substrate in the same manner that an ordinary crayon would be employed. The resulting chemiluminescent deposit or streak on the substrate starts to luminesce immediately and continues to give off light of satisfactory intensity for nocturnal marking purposes for an appreciable period of time. One of the parameters governing the duration of chemiluminescence is the depth to which oxygen can penetrate the deposited layer of the composition before the self-sealing properties heretofore described come into play. Any of a wide variety of substrates can be marked by the compositions of this invention. The surface can be soft, porous, or hard like Alberene stone.

The formulations of this invention are useful for nocturnal identification of objects, personnel and areas, and for nighttime signalling. They are also useful for illuminating designated area on roadways during temporary emergency conditions such as automobile accidents or other obstructions to traffic, and for nighttime designation of travel routes or trails.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A chemiluminescent marking material which comprises at least one non-aromatic hydrocarbon wax and at least one peraminoethylene of the formula

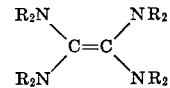

wherein the R's are selected from the group consisting of monovalent alkyl and cycloalkyl of up to 10 carbons, divalent alkylene joined to the other R attached to the same N to form a 3–5 membered monoazaheterocycle and divalent alkylene joined to an R attached to a second N to form a 3–7 membered diazaheterocycle, said material being characterized by its ability to self-seal following deposit of a luminescent mark.

2. The material of claim 1 in which the wax is paraffin and the chemiluminescent ingredient is tetrakis(dimethylamino)ethylene.

3. Chemiluminescent marking materials comprising at least one non-aromatic hydrocarbon wax and a polymer and at least one peraminoethylene of the formula

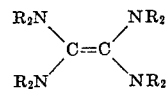

wherein the R's are selected from the group consisting of monovalent alkyl and cycloalkyl of up to 10 carbons, divalent alkylene joined to the other R attached to the same N to form a 3–5 membered monoazaheterocycle and divalent alkylene joined to an R attached to a second N to form a 3–7 membered diazaheterocycle, said material being characterized by its ability to self-seal following deposit of a luminescent mark.

4. A material of claim 3 wherein the polymer is polyisobutylene.

5. A chemiluminescent marking material comprising a blend of aliphatic and cyclic hydrocarbon waxes and a chemiluminescent ingredient of the formula

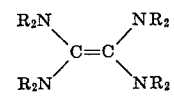

wherein the R's are selected from the group consisting of monovalent alkyl and cycloalkyl of up to 10 carbons, divalent alkylene joined to the other R attached to the same N to form a 3–5 membered monoazaheterocycle and divalent alkylene joined to an R attached to a second N to form a 3–7 membered diazaheterocycle, said material being characterized by its ability to self-seal following deposit of a luminescent mark.

6. A chemiluminescent marking material comprising ozokerite, petrolatum, polyisobutylene and at least one peraminoethylene of the formula

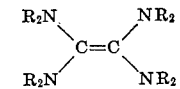

wherein the R's are selected from the group consisting of monovalent alkyl and cycloalkyl of up to 10 carbons, divalent alkylene joined to the other R attached to the same N to form a 3–5 membered monoazaheterocycle and divalent alkylene joined to an R attached to a second N to form a 3–7 membered diazaheterocycle.

7. A chemiluminescent marking material comprising ozokerite, petrolatum, polyisobutylene, microcrystalline wax and a peraminoethylene of the formula

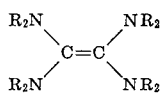

wherein the R's are selected from the group consisting of monovalent alkyl and cycloalkyl of up to 10 carbons, divalent alkylene joined to the other R attached to the same N to form a 3–5 membered monoazaheterocycle and divalent alkylene joined to an R attached to a second N to form a 3–7 membered diazaheterocycle.

8. A chemiluminescent material of claim 7 wherein the peraminoethylene is tetrakis(dimethylamino)ethylene.

9. A chemiluminescent material of claim 7 wherein the peraminoethylene is 1,1′,3,3′ - tetraethyl-$\Delta^{2,2'}$-bi(imidazolidine).

10. A chemiluminescent crayon comprising the following ingredients in substantially the following parts by weight

|  | Parts |
| --- | --- |
| ozokerite | 3 |
| microcrystalline wax | 5 |
| petrolatum | 3 |
| polyisobutylene | 1 |
| tetrakis(dimethylamino)ethylene | 3.44 |

11. A chemiluminescent marking material of claim 7 wherein the peraminoethyl is a mixture of tetrakis-(dimethylamino)ethylene and 1,1′,3,3′ - tetraethyl-$\Delta^{2,2'}$-bi(imidazolidine).

12. A process which comprises admixing in the absence of oxygen a chemiluminescent composition containing at least one peraminoethylene of the formula

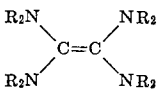

wherein the R's are selected from the group consisting of monovalent alkyl and cycloalkyl of up to 10 carbons, divalent alkylene joined to the other R attached to the same N to form a 3–5 membered monoazaheterocycle and divalent alkylene joined to an R attached to a second N to form a 3–7 membered diazaheterocycle, with a molten non-aromatic wax and solidifying the resulting composition.

13. A process which comprises admixing a chemiluminescent composition containing a peraminoethylene of the formula

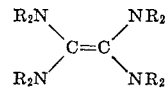

wherein the R's are selected from the group consisting of monovalent alkyl and cycloalkyl of up to 10 carbons, divalent alkylene joined to the other R attached to the same N to form a 3–5 membered monoazaheterocycle and divalent alkylene joined to an R attached to a second N to form a 3–7 membered diazaheterocycle, with a blend of nonaromatic hydrocarbon waxes, polyisobutylene, heating the resulting mixture with stirring until the polyisobutylene is dissolved in the molten wax blend and then solidifying the resulting composition in a form.

14. A process which comprises admixing in the absence of oxygen a chemiluminescent composition containing at least one peraminoethylene of the formula

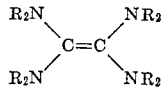

wherein the R's are selected from the group consisting of monovalent alkyl and cycloalkyl of up to 10 carbons, divalent alkylene joined to the other R attached to the same N to form a 3–5 membered monoazaheterocycle and divalent alkylene joined to an R attached to a second N to form a 3–7 membered diazaheterocycle, with a molten non-aromatic wax, solidifying the resulting composition, and extruding said composition into its final shape.

References Cited
UNITED STATES PATENTS 2,420,286  5/1947  Lacey et al.
3,057,806  10/1962  Switzer.

OTHER REFERENCES

Pruett et al.: JACS, 72, 3649, August 1950.

LEON D. ROSDOL, *Primary Examiner.*

J. D. WELSH, *Assistant Examiner.*